(12) United States Patent
Blin et al.

(10) Patent No.: US 11,646,423 B2
(45) Date of Patent: May 9, 2023

(54) CURRENT COLLECTOR, ASSOCIATED SET AND STORING DEVICE

(71) Applicant: ARMOR, Nantes (FR)

(72) Inventors: Marie-Anne Blin, Orvault (FR); Pierre Guichard, Reze (FR); Cyril Paireau, Le Loroux Bottereau (FR)

(73) Assignee: ARMOR, Nantes (FR)

( * ) Notice: Subject to any disclaimer, the term of this patent is extended or adjusted under 35 U.S.C. 154(b) by 328 days.

(21) Appl. No.: 16/827,858

(22) Filed: Mar. 24, 2020

(65) Prior Publication Data

US 2020/0313199 A1 Oct. 1, 2020

(30) Foreign Application Priority Data

Mar. 26, 2019 (FR) ..................... 19 03146

(51) Int. Cl.
*H01M 4/66* (2006.01)
*H01G 11/32* (2013.01)
*H01G 11/62* (2013.01)
*H01G 11/70* (2013.01)
*H01M 10/0525* (2010.01)
*H01M 10/0568* (2010.01)

(52) U.S. Cl.
CPC ............ *H01M 4/667* (2013.01); *H01G 11/32* (2013.01); *H01G 11/62* (2013.01); *H01G 11/70* (2013.01); *H01M 4/663* (2013.01); *H01M 10/0525* (2013.01); *H01M 10/0568* (2013.01); *H01M 2300/0025* (2013.01)

(58) Field of Classification Search
CPC .. H01M 4/667; H01M 4/663; H01M 10/0525; H01M 10/0568; H01M 2300/0025; H01G 11/32

See application file for complete search history.

(56) References Cited

U.S. PATENT DOCUMENTS

| 2009/0130564 | A1 | 5/2009 | Shembel |
| 2009/0148759 | A1 | 6/2009 | Mitsuda et al. |
| 2012/0121974 | A1 | 5/2012 | Tikhonov et al. |
| 2013/0209889 | A1* | 8/2013 | Takahata ............... H01M 4/663 29/623.5 |
| 2018/0287120 | A1* | 10/2018 | Nakajima ........... H01M 50/489 |

FOREIGN PATENT DOCUMENTS

| EP | 2500969 A1 | 9/2012 |
| EP | 3399574 A1 | 11/2018 |

OTHER PUBLICATIONS

Search Report for French Application No. FR 1903146 dated Oct. 24, 2019.

* cited by examiner

*Primary Examiner* — Stewart A Fraser
(74) *Attorney, Agent, or Firm* — Pearne & Gordon LLP

(57) ABSTRACT

A current collector of an electrochemical actuator is proposed, the current collector being coated with an interfacing layer, the interfacing layer being formed by coating on the current collector with a composition, the composition being formed by particles, at least 50% of the particles having a mean diameter by volume of less than or equal to 10 micrometers.

13 Claims, 4 Drawing Sheets

[Fig 1]
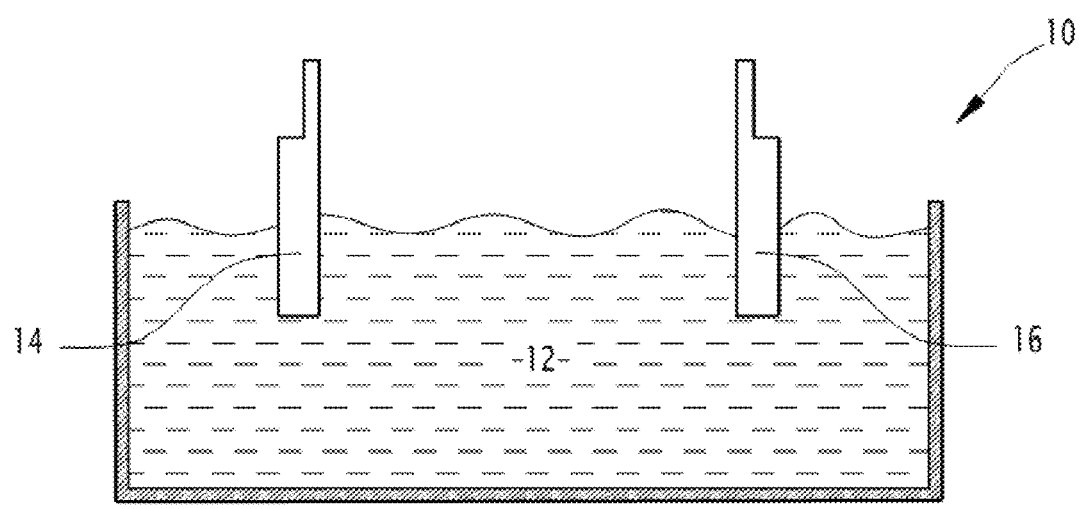

[Fig 2]
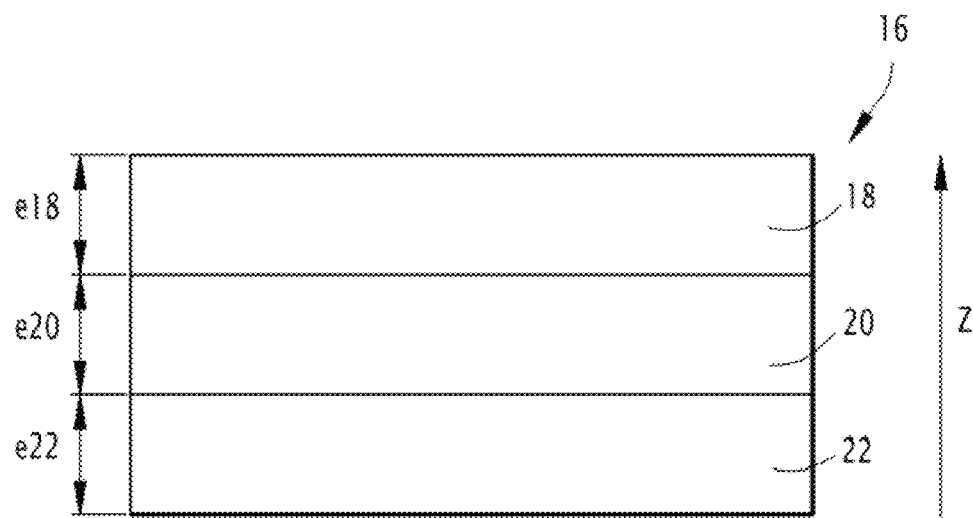

[Fig 3]
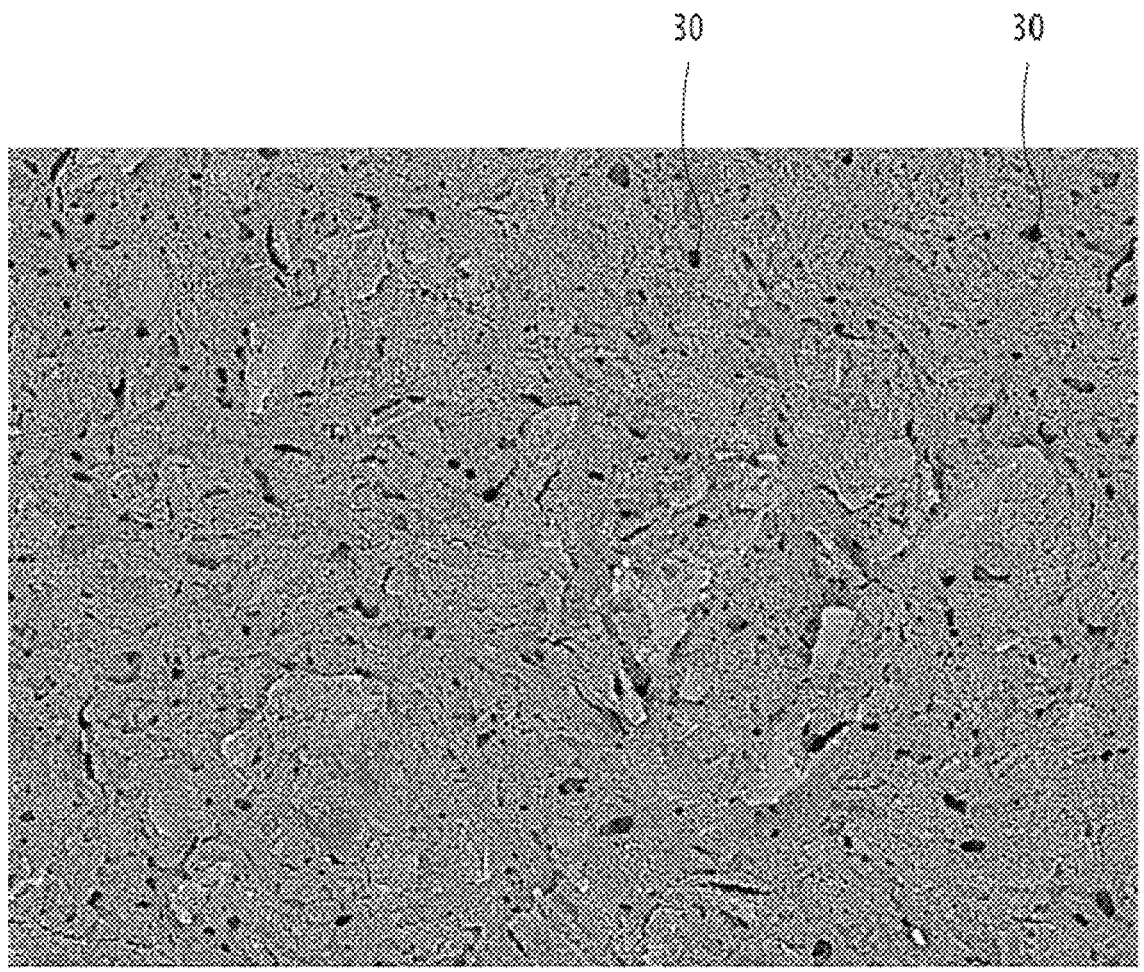

[Fig 4]
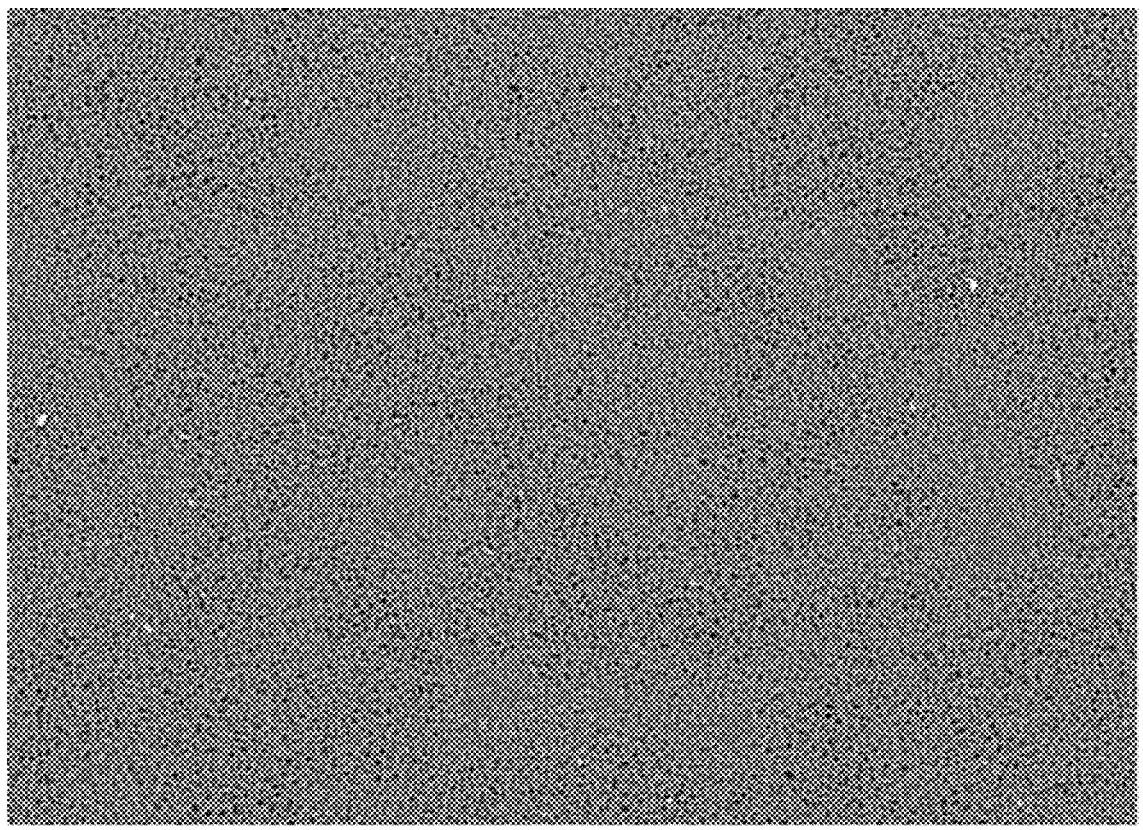

CURRENT COLLECTOR, ASSOCIATED SET AND STORING DEVICE

TECHNICAL FIELD OF THE INVENTION

The present invention relates to a coated current collector. The invention also relates to an assembly and a storage device including such a current collector.

BACKGROUND OF THE INVENTION

An electrochemical accumulator conventionally comprises at least four elements: a positive electrode, a negative electrode, an electrolyte, and current collectors for each electrode. The assembly of a negative electrode and a current collector forms an anode, while the assembly of a positive electrode and a current collector forms a cathode.

The operating principle of these accumulators is based on the reversible storage of electrical energy into chemical energy by using two separate and coupled electrochemical reactions. It is the positive and negative electrodes, which bathe in the electrolyte, that are the seat of electrochemical reactions, called faradic reactions. The electrodes are in particular made from active materials that make it possible to store and release the ions through oxidation and reduction reactions.

During the discharge, the active material at the negative electrode oxidizes and releases part of the electrons that are conveyed by means of the current collector toward the outer circuit and on the other hand cations that migrate through the electrolyte toward the positive electrode. Next, the electrons that have passed through the circuit that have used the energy thereof, and the cations are captured by the active material at the positive electrode, which is reduced. The energy density that an accumulator can release depends on both the potential and the capacity of the electrochemical cell, both of which are directly connected to the chemistry of the system. The potential of a battery is determined by the difference between the potentials of the oxidation-reduction reactions occurring simultaneously at the positive and negative electrodes.

The electrodes are made according to a composition, the composition primarily including one or several active material(s) (>90% by weight), conductive particles ensuring a good transport of the electrons to the set of active materials and a binder that makes it possible to ensure the cohesion of the particles, as well as the adhesion to the substrate.

The whole is generally manufactured in the form of a formulation comprising at least one solvent that will make it possible to coat the electrode.

Next, the two positive and negative electrodes are ionically linked by an electrolyte. This can be liquid, in gel form or solid.

Due to the intrinsic migration operation of the ions of the accumulators, their electrodes need materials capable of inserting or removing the ions. Many developments are therefore carried out in order to optimize these electrodes and obtain a higher specific energy density and power. The selection criteria are essentially based on the available capacity and the operating potential—and therefore the available energy—but also the power or the safety and the cost of the materials.

The mass energy or specific energy is defined as the ratio between the retrievable energy at a specific rating (discharge C-rate at which the accumulator is discharged) and the mass of the accumulator. The mass energy is expressed in Wh/kg. This notion is particularly useful for the dimensioning of a battery in embedded systems where the mass is a preponderant dimensioning criterion.

The volume energy is the ratio between the retrievable energy at a given rating and the volume of the accumulator. The volume energy is expressed in Wh/L. This notion is useful for the dimensioning of a stationary battery, since in these applications, the volume is often a more decisive criterion than the mass.

Lithium technologies have the best characteristics in terms of mass and volume energy densities. These technologies are therefore preferably chosen for roaming applications, such as mobile telephony or laptop computers.

However, for certain applications, and in particular in the automotive field, the voltage limitation of such typical accumulators to voltages below or equal to 3.5 Volts (V) is problematic. It is therefore desirable to use accumulators of the lithium-ion type having a higher voltage, in particular about 4.2 Volts (V).

With such a significant increase in the voltage, corrosion phenomena are more pronounced.

To address such a problem, document US 2012/0121974 proposes the combination of two elements. According to a first element, the current collector of the cathode is protected by a porous protective conductive coating. The porous coating comprises carbon or conductive graphite. The protection from corrosion also involves a modification of the electrolytic solution, particularly with the addition of additives such as LiBOB or $LiPF_6$.

However, the modification of the electrolyte is expensive on the one hand, and on the other hand affects the performance of the batteries.

BRIEF DESCRIPTION OF THE INVENTION

There is therefore a need for a current collector for an electrode making it possible to obtain an accumulator having better performance levels while being capable of delivering a voltage higher than the voltages delivered in the state of the art, in particular a voltage higher than 3.5 Volts.

Indeed, the choice of corrosive materials making it possible to target better performance levels in terms of potential, it is advantageous for the manufacturers of batteries to be able to develop their electrochemical system from an improved current collector and therefore the properties are stable over time.

To that end, the present disclosure relates to a current collector of a device for storing electrical energy, the current collector being coated with an interfacing layer, the interfacing layer being formed by coating on the current collector with a second composition (the composition being the second according to the name of the specification), the composition being formed by particles, at least 50% of the particles having a mean diameter by volume of less than or equal to 10 micrometers.

By the expression «formed by», it should be understood «made of», that is to say that, in this context, the diameters of the particles are measured in the composition after its information and not at the insertion.

According to specific embodiments, the collector comprises one or more of the following features, considered alone or according to any technically possible combinations:
the interfacing layer is a layer acting as a physical barrier to the access of the ions responsible for the corrosion.
the interface layer is a layer preventing the oxidation of the current collector even when the operating potential of the device for storing electrical energy is superior or equal to the oxidation potential of the material of the current collector.

the current collector is adapted for a device for storing electrical energy comprising an electrolyte comprising ionic salts are chosen from among lithium bis(trifluoromethane sulfonyl)imide salt (LiTFSI), lithium bis (fluorosulfonyl)imide (LiFSI) salt, lithium trifluoromethane-sulfonate salt (LiTF), lithium tetrafluoroborate (LiBF4), lithium bis(oxalato)borate (LiBOB), lithium difluoro(oxalato)borate (LiDFOB) and a mixture thereof.

the ionic salt is lithium bis(trifluoromethane sulfonyl)imide salt (LiTFSI).

at least 90% of the particles have a mean diameter by volume of less than or equal to 15 micrometers.

at least 99% of the particles have a diameter of less than or equal to 10 micrometers.

the composition comprises a conductive material and a binder material.

the second composition consists in a conductive additive, a solvent and a binder material.

the conductive material comprises at least one element chosen from the list made up of carbon, carbon black, graphite, graphene, a carbon nanotube, an activated carbon fiber, and a nonactivated carbon nanofiber.

the interfacing layer has a thickness greater than or equal to 1 micrometer.

the interfacing layer has a thickness less than or equal to 4 micrometers, preferably less than or equal to 2 micrometers.

The present disclosure also describes an assembly forming an anode or a cathode including an electrode, and a current collector as previously described.

The present disclosure also relates to an electrical energy storage device, electrochemical accumulator or supercapacitor, including an assembly as previously described.

BRIEF DESCRIPTION OF THE DRAWINGS

Other features and advantages of the invention will appear upon reading the following description of embodiments of the invention, provided as an example only and in reference to the drawings, which are:

FIG. 1, a schematic illustration of a battery accumulator including an anode and a cathode;

FIG. 2, a schematic sectional side illustration of the cathode of the accumulator of FIG. 1;

FIG. 3, a photograph by scanning electron microscopy of a coated collector according to the state of the art; and FIG. 4, a photograph by scanning electron microscopy of a coated collector used to form the cathode of FIG. 2.

DETAILED DESCRIPTION OF THE INVENTION

The accumulator 10 is intended to be linked to other electrical accumulators in order to form an electrical generator of desired voltage and capacity. Such a generator is called accumulator battery, or more simply a battery.

An accumulator 10 uses a reversible energy conversion technique to store the energy and retrieve it later.

The described accumulator 10 using an electrochemical reaction, the accumulator 10 is an electrochemical accumulator.

The accumulator 10 comprises an electrolyte 12, an anode 14 and a cathode 16.

Typically, the electrolyte 12 is made up of different ionic salts contributing ions used for the charge storage or faradic reactions, of carbonates and a solvent or mixture of solvents to allow the solubilization of the ions.

The electrolyte 12 is made up of different ionic salts contributing ions used for the charge storage or faradic reactions, of carbonates and a solvent or mixture of solvents to allow the solubilization of the ions.

Preferably, the ionic salts are chosen from among lithium bis(trifluoromethane sulfonyl)imide salt (LiTFSI), lithium bis(fluorosulfonyl)imide (LiFSI) salt, lithium trifluoromethane-sulfonate salt (LiTF), lithium tetrafluoroborate (LiBF4), lithium bis(oxalato)borate (LiBOB), lithium difluoro(oxalato)borate (LiDFOB) and a mixture thereof.

The carbonates are for example propylene carbonate (PC), ethylene carbonate (EC), dimethyl carbonate (DMC), ethyl methyl carbonate (EMC) or diethyl carbonate (DEC).

It is also possible to find, in smaller proportion, methyl acetate or methyl formate, acetonitrile, tetrahydrofuran or gamma-butyroactone, in binary or ternary mixtures, or even quaternary mixtures thereof, as well as ionic liquids.

Typically, the anode 14 is made up of an ionic insertion material, for example in a lithium-ion accumulator, carbon, which is used very primarily in the form of "MesoCarbon MicroBeads" (MCMB), graphites, whether they are artificial or natural or graphitic materials such as soft or hard carbon or other types of negative electrode materials with a base of lithium titanate ($Li_4Ti_5O_{12}$ or LTO), silicon, tin or alloys.

The cathode 16 is shown in more detail in FIG. 2.

The cathode 16 comprises an electrode 18, a current collector 22 and an interfacing layer 20.

The current collector 22, the interfacing layer 20 and the electrode 18 form a stack of layers in a stacking direction denoted Z.

The electrode 18 is in contact with the electrolyte 12.

The electrode 18 is made from a first composition C1, the properties of which will now be described.

The first composition C1 comprises a first insertion material MI1, a first binder material ML1 and a first conductive additive AC1.

The insertion material is also referred to as "active material".

In a lithium-ion accumulator, the active material MI1 of the electrode 18 is conventionally made up of lithium metal oxide, for example $LiCoO_2$ (LCO), $LiNiMnCoO_2$ (NMC), $LiNiCoAlO_2$ (NCA), $LiMn_2O_4$ (LMO), LiFePO4 (LFP), $Li(LiNiMn)O_2$ or LiNiMnO (LNMO); LiS. Other examples of active material of the electrode 18 are possible, for example for sodium-ion batteries, such examples are listed in the publication "Advanced Organic Electrode Materials for Rechargeable Sodium-Ion Batteries," Zhao, Q., Lu, Y., & Chen, J. *Advanced Energy Materials* (2016).

The choice of the first binder material ML1 can vary considerably as long as the first binder material ML1 is inert relative to the other materials of the electrode. The first binder material ML1 is a typically polymeric material, which makes it possible to facilitate the use of the electrodes during their manufacture. The first binder material ML1 typically comprises one or several polymers chosen from among thermoplastic polymers, thermosetting polymers, elastomers and mixtures thereof.

Examples of thermoplastic polymers comprise but are not limited to polymers derived from the polymerization of aliphatic or cycloaliphatic vinyl monomers, such as polyolefins (including polyethylenes or polypropylenes), polymers derived from the polymerization of aromatic vinyl monomers, such as polystyrenes, polymers derived from the polymerization of acrylic monomers and/or methacrylates, polyamides, polyether ketones, polyimides.

Examples of thermosetting polymers comprise, but are not limited to, thermosetting resins (such as epoxide resins or polyester resins), optionally mixed with polyurethanes or with polyol polyethers or vice versa.

Examples of elastomeric polymers comprise, but are not limited to, natural rubbers, synthetic rubbers, styrene-butadiene copolymers (also referred to using the abbreviation "SBR"), ethylene-propylene copolymers (also referred to using the abbreviation "EPM"), silicones.

The first binder material ML1 can be a mixture of thermoplastic polymer(s), thermosetting polymer(s) and/or elastomeric polymer(s).

Other appropriate first binder material(s) ML1 comprise cross-linked polymers, such as those manufactured from polymers having carboxyl groups and cross-linking agents.

The first conductive additive AC1 comprises one or several types of conductive elements for improving the electronic conductivity.

Examples of conductive elements comprise, but are not limited to, conductive carbons, graphites, graphenes, carbon nanotubes, activated carbon fibers, non-activated carbon nanofibers, metallic flakes, metallic powders, metallic fibers and electrically conductive polymers.

As an example, the thickness e18 of the electrode 18 is 50 µm.

The current collector 22 is made from a material that is conductive enough to ensure electronic transport, light, fine, mechanically strong to serve as a substrate for the electrode 18.

For example, the current collector 20 is a metallic strip made from iron, copper, aluminum, nickel, titanium or stainless steel.

Preferably, the current collector 20 is a metallic strip made from aluminum.

As an example, the thickness e22 of the current collector 22 is 20 µm.

The interfacing layer 20 forms an interface between the current collector 22 and the electrode 18.

This in particular means that the interfacing layer 20 is a layer in contact on the one hand with the current collector 22 and on the other hand with the electrode 18.

The interfacing layer 20 is coated on the current collector 22.

The interfacing layer 20 has a thickness e20 greater than or equal to 1 micrometer (µm).

Preferably, the interfacing layer 20 has a thickness e20 of greater than or equal to 2 µm.

Advantageously, the interfacing layer 20 has a thickness e20 of between 1 µm and 4 µm.

The interfacing layer 20 is made according to a second composition C2.

The second composition C2 comprises a second binder material ML2 and a second conductive additive AC2.

Advantageously, the second composition C2 consists of a second binder material ML2, a second conductive additive AC2 and a second solvent S2.

In each of the aforementioned cases, the second composition C2 comprises a plurality of particles.

Such particles can have all types of shapes. Preferably, the particles are spherical.

For each particle, a diameter is defined as the maximum distance between two points of the surface of the particle.

The diameter is for example measured by a laser particle size analysis technique.

The technique for measuring particle size by laser diffraction measures the particle size distribution of the particles by measuring the angular variation of the scattered light intensity when a laser beam passes through a sample of dispersed particles. The large particles scatter the light at small angles relative to the laser beam and the small particles scatter the light at larger angles.

Among the particles of the second composition C2, a proportion of particles have a mean diameter by volume smaller than or equal to a threshold diameter.

In each of the cases, at least 50% of the particles have a mean diameter by volume (called Dv50) of less than or equal to 10 micrometers.

The mean diameter by volume is a particle size distribution parameter (see in particular A Basic Guide to Particle Characterization, page 10, published by Malvern Instruments Limited in 2012).

The mean diameter by volume of the particles (such as Dv50) can be measured by static light using a commercial granulometer such as the MasterSizer 3000 machine by Malvern. The data are processed based on the Mie scattering theory in order to calculate the particle size distribution of the particles based on a spherical model of equivalent volume. More specifically, this theory, which is accurate for the isotropic particles, makes it possible to determine, in the case of non-spherical particles, an "effective" particle diameter. This theory is in particular described in the publication by Van de Hulst, H. C., "Light Scattering by Small Particles", chapters 9 and 10, Wiley, New York, 1957.

According to a first example, the proportion is greater than or equal to 90% and the threshold diameter is less than or equal to 30 µm, preferably less than or equal to 20 µm, and still more preferably less than or equal to 10 µm.

Advantageously, the threshold diameter is less than or equal to 5 µm.

Thus, according to this first example, at least 90% of the particles have a mean diameter by volume (called Dv90) of less than or equal to 30 micrometers.

According to a second example, the proportion is greater than or equal to 99% and the threshold diameter is less than or equal to 40 µm, preferably less than or equal to 30 µm, and still more preferably less than or equal to 20 µm.

Advantageously, the threshold diameter is less than or equal to 10 µm.

Thus, according to this second example, at least 99% of the particles have a mean diameter by volume (called Dv99) of less than or equal to 40 micrometers.

According to a third example, the proportion is greater than or equal to 75% and the threshold diameter is less than or equal to 25 µm, preferably less than or equal to 15 µm, and still more preferably less than or equal to 5 µm.

Advantageously, the threshold diameter is less than or equal to 3 µm.

Thus, according to this third example, at least 75% of the particles have a mean diameter by volume (called Dv75) of less than or equal to 25 micrometers.

According to a fourth example, the proportion is greater than or equal to 50% and the threshold diameter is less than or equal to 5 µm, and still more preferably less than or equal to 3 µm.

Advantageously, the threshold diameter is less than or equal to 1 µm.

Thus, according to this fourth example, at least 50% of the particles have a mean diameter by volume (called Dv50) of less than or equal to 5 micrometers.

According to a fifth example, all of the particles have a mean diameter by volume less than or equal to 40 µm, preferably less than or equal to 30 μm, and still more preferably less than or equal to 20 μm. Advantageously, the mean diameter by volume for such a proportion of 100% is less than or equal to 15 μm.

In each of the described examples, at least 50% of the particles of the second composition C2 forming the interface layer 20 has a mean diameter by volume of less than or equal to 10 μm.

The diameter of the particles is obtained owing to the choice of the binder materials ML2, conductive additives AC2 and solvents S2, due to the mass of these various elements and the methods of implementation, including the mixing and grinding. The mixing technique consists of pre-dispersing the conductive additives in the solubilized binder materials, the conductive additives at this stage being in an agglomerate state (large particles with a diameter greater than 50 μm). The grinding technique consists of breaking the agglomerates to obtain the mean diameter by volume of the particles as previously disclosed.

This corresponds to the fact that the expression "the composition being formed by particles, at least 50% of the particles having a mean diameter by volume of less than or equal to 10 micrometers" means that the mean diameter is measured on particles in the composition and excludes the measurement of diameters of the ingredients in the form of particles before the insertion of the composition when the formation of the composition changes the size of the particles.

In such context, it can thus be written in an equivalent way that the second composition C2 can be formed of particles or that the second composition is a composition comprising particles.

In other words, the measurement of mean diameter in volume is here a granulometry of carboned ink, that is to say of the dispersion of carbon in a polymeric matrix.

The choice of the second binder material ML2 can vary considerably as long as the second binder material ML2 is inert relative to the other materials of the second composition C2. The second binder material ML2 comprises one or several polymers chosen from among thermoplastic polymers, thermosetting polymers, elastomers and mixtures thereof.

Examples of thermoplastic polymers comprise but are not limited to polymers derived from the polymerization of aliphatic or cycloaliphatic vinyl monomers, such as polyolefins (including polyethylenes or polypropylenes), polymers derived from the polymerization of aromatic vinyl monomers, such as polystyrenes, polymers derived from the polymerization of acrylic monomers and/or methacrylates, polyamides, polyether ketones, polyimides, polyvinyl alcohols, fluorinated polymers, polyacrylonitrile.

Examples of thermosetting polymers comprise, but are not limited to, thermosetting resins (such as epoxide resins or polyester resins), optionally mixed with polyurethanes or with polyol polyethers or vice versa.

Examples of elastomeric polymers comprise, but are not limited to, natural rubbers, synthetic rubbers, styrene-butadiene copolymers (also referred to using the abbreviation "SBR"), ethylene-propylene copolymers (also referred to using the abbreviation "EPM"), silicones.

The second binder material ML2 can be a mixture of thermoplastic polymer(s), thermosetting polymer(s) and/or elastomeric polymer(s).

Other appropriate second binder material(s) ML2 comprise cross-linked polymers, such as those manufactured from polymers having carboxyl groups and cross-linking agents.

The second conductive additive AC2 comprises one or several types of conductive elements for improving the electronic conductivity.

Examples of conductive elements comprise, but are not limited to, conductive carbons, graphites, graphenes, carbon nanotubes, activated carbon fibers, non-activated carbon nanofibers, metallic flakes, metallic powders, metallic fibers and electrically conductive polymers.

The second solvent S2 is chosen from among water, ethanol, butanol, isopropyl alcohol (also called isopropanol), glycol ether and a mixture thereof.

The operation of the accumulator 10 is according to the operation of an electrochemical accumulator of the state of the art.

To evaluate the performance of the interfacing layer 20, the covering of the current collector with a layer according to the state of the art has been compared by the naked eye to that with an interfacing layer 20 according to the state of the art.

In particular, a comparison is done of a commercial composition (DAG EB-012 from Henkel Inc.) and a second composition C2 having a mean diameter by volume (Dv90) of 5 μm for 90% of the particles and a mean diameter by volume (Dv90) of 10 μm for 99% of the particles.

By comparison, it is measured that the commercial composition comprises particles whereof 90% of the particles have a threshold diameter of 49 μm and 99% of the particles have a threshold diameter of 85 μm, and 50% of the particles have a threshold diameter of 13 μm.

FIGS. 3 and 4 correspond to the photograph obtained by scanning electron microscopy in the case of a magnification of 1000.

In the case of FIG. 3, the interfacing layer obtained from the coating of the commercial composition shows holes, even with a thickness of 5 μm, as observed in FIG. 3. It is not possible to reduce the thickness without generating an area with significant lacks of coverage.

Even with a thickness of 5 μm, the coverage does not visually reach the coverage observed with the interfacing layer 20 with a thickness of 1 μm obtained from the second composition C2 observed in FIG. 4.

The collector of FIG. 4 seems to be entirely covered by the interfacing layer 20, while the collector is visible in FIG. 3, in particular at the hole 30.

These tests correspond to the unexpected observation by the applicant that good coverage of the collector is obtained if the particle size of the particles forming the interfacing layer 20 is controlled.

Such good-quality coverage allows protection of the current collector, the interfacing layer therefore acting as a physical barrier to the access of the ions responsible for the corrosion.

Additional tests have shown that this coverage makes it possible to obtain good corrosion resistance, even for high potentials.

In particular, an oxidation of the collector takes place from a potential of 3.7 V for the interfacing layer obtained from the commercial composition (3.7 V corresponding to the oxidation potential of aluminum, the holes of the interfacing layer are direct accesses for the electrolyte to the aluminum that oxidizes) while the oxidation of the collector does not take place up to 4.2 V for an interfacing layer 20 as previously described.

This shows that the interfacing layer 20 is a layer preventing the oxidation of the current collector even when the operating potential of the device for storing electrical energy is superior or equal to the oxidation potential of the material of the current collector.

Thus, a current collector has been disclosed for forming an assembly making it possible to obtain an accumulator having better performance levels while being capable of delivering a voltage higher than the voltages delivered in the state of the art, in particular a voltage higher than 3.5 Volts.

The current collector can also be used for another electric energy storage device such as a supercapacitor.

The invention claimed is:

1. A current collector of a device for storing electrical energy, the current collector being coated with an interfacing layer, the interfacing layer being formed by coating on the current collector with a composition,
the composition comprising a conductive additive, a solvent and a binder material,
the composition being a composition comprising particles, the particles being obtained by carrying out a mixing technique and a grinding technique, the mixing technique consists of pre-dispersing the conductive additive in the solvent and the binder material, the conductive additive forming agglomerates before the grinding technique with a diameter greater than 50 μm, the grinding technique consisting in breaking the agglomerates, at least 50% of the particles having a mean diameter by volume of less than or equal to 10 micrometers,
the mean diameter by volume being measured on the particles of the composition by static light using a granulometer and by processing the data obtained by the granulometer to calculate the particle size distribution on the basis of a spherical model of equivalent volume.

2. The current collector according to claim 1, wherein the interfacing layer is a layer acting as a physical barrier to prevent ions responsible for corrosion from accessing the current collector.

3. The current collector according to claim 1, wherein the interfacing layer is a layer preventing oxidation of the current collector even when an operating potential of the device for storing electrical energy is superior or equal to an oxidation potential of a material of the current collector.

4. The current collector according to claim 1, wherein the current collector is adapted for a device for storing electrical energy comprising an electrolyte comprising ionic salts chosen from among lithium bis(trifluoromethane sulfonyl) imide salt (LiTFSI), lithium bis(fluorosulfonyl)imide (LiFSI) salt, lithium trifluoromethane-sulfonate salt (LiTF), lithium tetrafluoroborate (LiBF4), lithium bis(oxalato)borate (LiBOB), lithium difluoro(oxalato)borate (LiDFOB) and a mixture thereof.

5. The current collector according to claim 4, wherein at least one of the ionic salts is lithium bis(trifluoromethane sulfonyl)imide salt (LiTFSI).

6. The current collector according to claim 1, wherein at least 90% of the particles have a mean diameter by volume of less than or equal to 15 micrometers.

7. The current collector according to claim 1, wherein at least 99% of the particles have a diameter of less than or equal to 10 micrometers.

8. The current collector according to claim 1, wherein the conductive additive comprises at least one element chosen from the list made up of:
carbon,
carbon black,
graphite,
graphene,
a carbon nanotube,
an activated carbon fiber, and
a nonactivated carbon nanofiber.

9. The current collector according to claim 1, wherein the interfacing layer has a thickness greater than or equal to 1 micrometer.

10. The current collector according to claim 1, wherein the interfacing layer has a thickness less than or equal to 4 micrometers.

11. The current collector according to claim 1, wherein the interfacing layer has a thickness less than or equal to 2 micrometers.

12. An assembly forming an anode or a cathode, including:
an electrode, and
a current collector according to claim 1.

13. An electrical energy storage device, electrochemical accumulator or supercapacitor, including an assembly according to claim 12.

* * * * *

UNITED STATES PATENT AND TRADEMARK OFFICE
CERTIFICATE OF CORRECTION

| | | |
|---|---|---|
| PATENT NO. | : 11,646,423 B2 | Page 1 of 1 |
| APPLICATION NO. | : 16/827858 | |
| DATED | : May 9, 2023 | |
| INVENTOR(S) | : Marie-Anne Blin et al. | |

It is certified that error appears in the above-identified patent and that said Letters Patent is hereby corrected as shown below:

On the Title Page

Item (73) should read as follows:
--(73) Assignee: ARMOR BATTERY FILMS, NANTES FR--

Signed and Sealed this
Fourth Day of February, 2025

Coke Morgan Stewart
*Acting Director of the United States Patent and Trademark Office*